US012762434B2

(12) United States Patent
Shih et al.

(10) Patent No.: US 12,762,434 B2
(45) Date of Patent: Oct. 13, 2026

(54) METHOD FOR DEVELOPING AGITATION SYSTEM OF A SCALE-UP POLYMERIZATION VESSEL

(71) Applicant: FORMOSA PLASTICS CORPORATION, Mailiao Township, Yunlin County (TW)

(72) Inventors: Fuh-Yih Shih, Kaohsiung City (TW); Shih-Ming Yeh, Kaohsiung City (TW); Yu-Cheng Chen, Kaohsiung City (TW); Jun-Teng Chen, Kaohsiung City (TW)

(73) Assignee: FORMOSA PLASTICS CORPORATION, Mailiao Township (TW)

( * ) Notice: Subject to any disclaimer, the term of this patent is extended or adjusted under 35 U.S.C. 154(b) by 533 days.

(21) Appl. No.: 18/347,862

(22) Filed: Jul. 6, 2023

(65) Prior Publication Data

US 2024/0078445 A1 Mar. 7, 2024

(30) Foreign Application Priority Data

Sep. 1, 2022 (TW) ................................ 111133241

(51) Int. Cl.
*G06N 5/022* (2023.01)
*G06N 3/02* (2006.01)

(52) U.S. Cl.
CPC ............... *G06N 5/022* (2013.01); *G06N 3/02* (2013.01)

(58) Field of Classification Search
None
See application file for complete search history.

(56) References Cited

U.S. PATENT DOCUMENTS 6,024,483 A * 2/2000 Burke ...................... B01J 19/20 366/319
7,424,465 B2 9/2008 Schuppert et al.
(Continued)

FOREIGN PATENT DOCUMENTS

CN 102898560 A 1/2013
CN 104462697 A 3/2015
(Continued)

OTHER PUBLICATIONS

Devaraj, Jeyaganesh, Aiman Ziout, and Jaber E. Abu Qudeiri. "Grey-based taguchi multiobjective optimization and artificial intelligence-based prediction of dissimilar gas metal arc welding process performance." Metals 11.11 (2021): 1858. (Year: 2021).*
(Continued)

*Primary Examiner* — Polina G Peach
(74) *Attorney, Agent, or Firm* — MUNCY, GEISSLER, OLDS & LOWE, P.C.

(57) ABSTRACT

The application relates to a method for developing the agitation system of a scale-up polymerization vessel. A simulated prediction model is obtained by use of a small polymerization vessel and by integrating Taguchi experimental design method with artificial intelligence (AI) neural network. Accordingly, vessel parameters for the agitation system of a scale-up polymerization vessel can be rapidly and accurately predicted based on simulation qualities thereof, further facilitating a construction of the agitation system of a scale-up polymerization vessel.

18 Claims, 1 Drawing Sheet

(56) References Cited

U.S. PATENT DOCUMENTS

| | | | | |
|---|---|---|---|---|
| 7,593,804 | B2 * | 9/2009 | Grichnik | G05B 23/0221 701/115 |
| 9,341,967 | B2 | 5/2016 | Tsujino et al. | |
| 10,273,353 | B2 * | 4/2019 | Henry | C08L 23/06 |
| 12,358,138 | B2 * | 7/2025 | Lonsberry | B23K 9/127 |
| 2002/0198349 | A1 * | 12/2002 | Norton | B01J 20/268 526/319 |
| 2007/0250214 | A1 * | 10/2007 | Lee | C08F 10/00 700/266 |
| 2008/0222067 | A1 * | 9/2008 | Lin | G06N 3/02 706/21 |
| 2016/0096907 | A1 * | 4/2016 | Stevenson | C08F 222/10 526/204 |
| 2017/0088647 | A1 * | 3/2017 | Reimers | C08F 210/16 |
| 2019/0362855 | A1 * | 11/2019 | Ma | G06T 7/0016 |
| 2020/0184028 | A1 * | 6/2020 | Hsieh | G06F 30/20 |
| 2020/0255861 | A1 * | 8/2020 | Doench | C12N 9/96 |
| 2020/0354490 | A1 * | 11/2020 | Ahn | C08F 14/06 |
| 2021/0174958 | A1 * | 6/2021 | Drake | G06N 20/10 |
| 2022/0235676 | A1 * | 7/2022 | Agarwal | F01K 13/02 |

FOREIGN PATENT DOCUMENTS

| | | | |
|---|---|---|---|
| CN | 111916656 | A | 11/2020 |
| CN | 113731220 | A | 12/2021 |
| TW | 1443186 | B | 7/2014 |
| TW | 201605602 | A | 2/2016 |
| TW | 202006031 | A | 2/2020 |

OTHER PUBLICATIONS

Castillo, Rafael R., et al. "Production of MCM-41 nanoparticles with control of particle size and structural properties: optimizing operational conditions during scale-up." International journal of molecular sciences 21.21 (2020): 7899. (Year: 2020).*

Shahbazian, Alen, Amir H. Navarchian, and Mahdi Pourmehr. "Application of Taguchi method to investigate the effects of process factors on the performance of batch emulsion polymerization of vinyl chloride." Journal of Applied Polymer Science 113.5 (2009): 2739-2746. (Year: 2009).*

Meyer, Thierry. "Scale-up of polymerization process: a practical example." Organic process research & development 7.3 (2003): 297-302. (Year: 2003).*

Ryan, D. F., L. P. B. M. Janssen, and L. L. Van Dierendonck. "Circulation time prediction in the scale-up of polymerization reactors with helical ribbon agitators." Tenth International Symposium on Chemical Reaction Engineering. Pergamon, 1988. (Year: 1988).*

Kuo, Chung-Feng Jeffrey, and Yi-Shiuan Wu. "Application of a Taguchi-based neural network prediction design of the film coating process for polymer blends." 2006, The International Journal of Advanced Manufacturing Technology 27.5: 455-461. (Year: 2006).*

Madić, Miloš J., and Miroslav R. Radovanović. "Optimal selection of ANN training and architectural parameters using Taguchi method: A case study." 2011, FME Transactions 39.2: 79-86. (Year: 2011).*

Fei, Ng Chin, Nik Mizamzul Mehat, and Shahrul Kamaruddin. "Practical applications of Taguchi method for optimization of processing parameters for plastic injection moulding: a retrospective review." 2013, International Scholarly Research Notices 2013. 1: 462174. (Year: 2013).*

Zhang Chao, "Research and application of CDF technology to ¢16m large seed precipitators", Apr. 29, 2016, pp. 12-20.

Liu Yan et al., "Dimensional Analysis of the Clarity in High Efficient Extraction and Clarification Tanks with Double Stirring", Journal of Northeastern University(Natural Science), Mar. 2013, vol. 34, No. 3, pp. 395-398.

Cai Zi-Jin et al., "Application of CFD in stirred tank sludies and scale-up of biochemical process", FOOD & MACHINERY, Nov. 2013, vol. 29, No. 6, pp. 108-112.

* cited by examiner

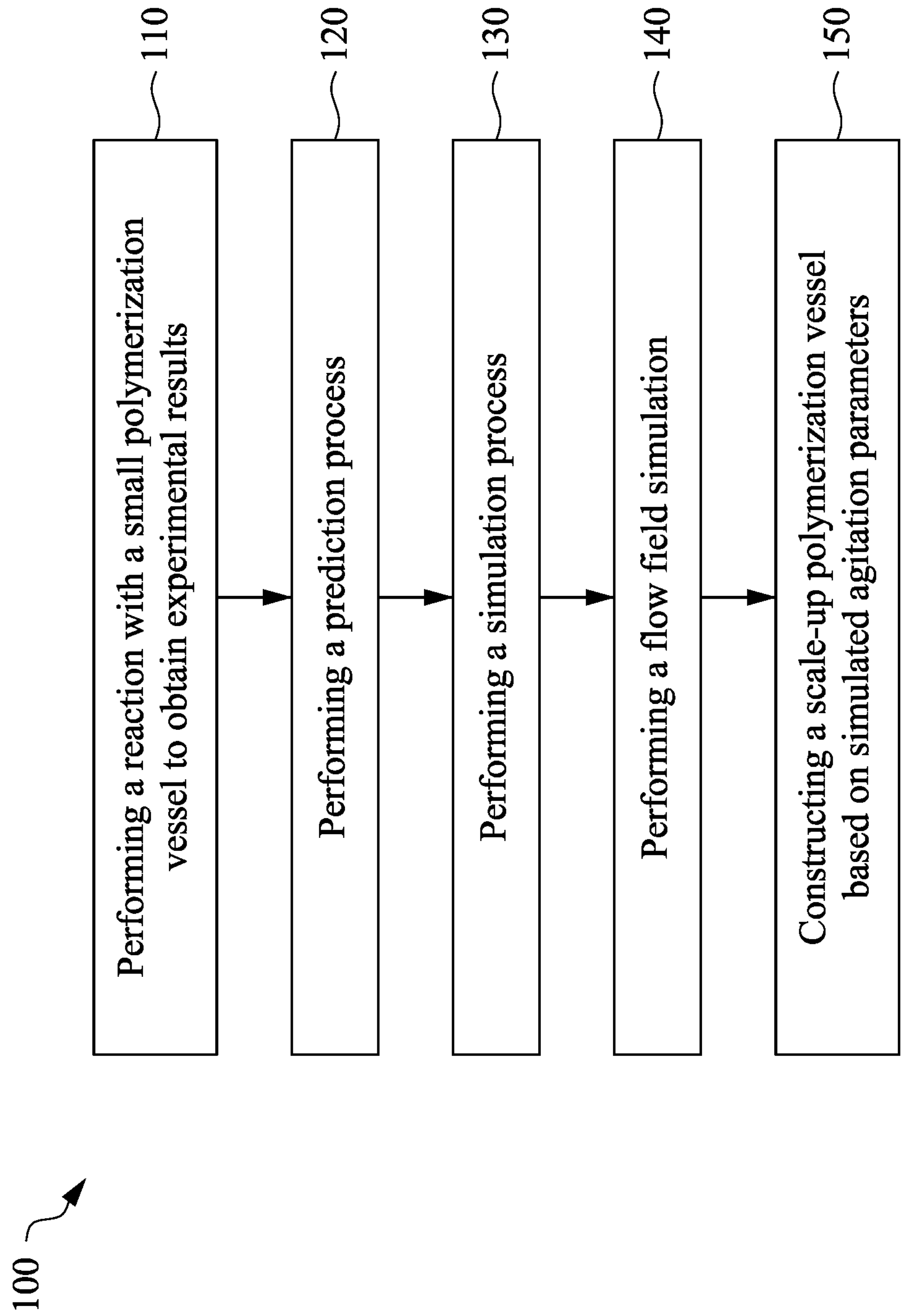
Performing a reaction with a small polymerization vessel to obtain experimental results
110
Performing a prediction process
120
Performing a simulation process
130
Performing a flow field simulation
140
Constructing a scale-up polymerization vessel based on simulated agitation parameters
150
100

METHOD FOR DEVELOPING AGITATION SYSTEM OF A SCALE-UP POLYMERIZATION VESSEL

RELATED APPLICATIONS

This application claims priority to Taiwan Application Serial Number 111133241, filed on Sep. 1, 2022, which is incorporated herein by reference.

BACKGROUND

Field of Invention

The application relates to a polymerization vessel. More particularly, the present application provides a method for developing an agitation system of a scale-up polymerization vessel.

Description of Related Art

With the development of material science, polymer materials with easy processing, light weight and excellent mechanical properties are widely used. Polymer materials are generally formed by subjecting monomer compounds in a polymerization vessel to polymerization reaction. A volume of the polymerization vessel is gradually enlarged for enhancing output of the polymer materials. However, reaction heat of the polymerization reaction is increased as the enlargement of the volume of the polymerization vessel, thereby lowering the mixing uniformity of the monomer compounds, and further the reactivity of the polymerization reaction is lowered.

Generally, the method for developing an agitation system of the scale-up polymerization vessel is performed by simulating various parameters of the scale-up polymerization vessel with unit operation software. However, the unit operation software is merely performed theoretical calculations instead of presenting situations of actual operations in the scale-up polymerization vessel. Therefore, it is usually necessary to modify and adjust the scale-up polymerization vessel constructed with the simulation of the software for meeting requirements of the actual operations.

In view of this, there is an urgent need to provide a method for developing a scale-up polymerization vessel mixing system capable of producing normal quality products, so as to further improve the defects of the conventional scale-up polymerization vessel mixing system development.

Accordingly, there is an urgent need to provide a method for developing an agitation system of the scale-up polymerization vessel capable of producing qualified products to improve the defects of the development for an agitation system for the conventional scale-up polymerization vessel.

SUMMARY

Therefore, an aspect of the present application is to provide a method for developing an agitation system of a scale-up polymerization vessel. An optimized simulated prediction model is obtained with a small polymerization vessel by integrating Taguchi experimental design method with an artificial intelligence neural network, and corresponding properties between dimensionless groups of the small polymerization vessel and the scale-up polymerization vessel are simulated by computational fluid dynamics (CFD), such that various agitation parameters for constructing the scale-up polymerization vessel can be obtained.

According to an aspect of the present application, a method for developing an agitation system of a scale-up polymerization vessel is provided. The agitation system is configured to be applied in the scale-up polymerization vessel. A reaction is firstly performed with a small polymerization vessel to obtain a plurality of experimental results. Each of the experimental results includes a plurality of structural parameter groups and a plurality of product qualities corresponding to the structural parameter groups, and each of the structural parameter groups includes a plurality of agitation parameters. Next, a prediction process is performed with Taguchi experimental design method and the experimental results to obtain a plurality of prediction results. The prediction results include a plurality of prediction parameter groups and a plurality of prediction qualities corresponding to the prediction parameter groups. Each of the prediction parameter groups includes a plurality of predictive agitation parameters. Then, a simulation process is performed with the experimental results and the prediction results to obtain a simulated prediction model. The simulation process is performed by an artificial intelligence neural network. And then, an optimized simulation parameter group of the small polymerization vessel is obtained by the simulated prediction model. The optimized simulation parameter group includes a plurality of simulated agitation parameters and a simulation quality corresponding to the simulated agitation parameters. The scale-up polymerization vessel is constructed based on the simulated agitation parameters.

According to some embodiments of the present application, the aforementioned small polymerization vessel includes a plurality of stirring blades and a plurality of choke tubes. The agitation parameters include a stirring speed, a blade diameter and a blade width of each of the stirring blades, a position of an uppermost stirring blade of the stirring blades, a distance between each of the choke tubes and a vessel wall, and/or a combination thereof.

According to some embodiments of the present application, the aforementioned agitation parameters are determined by a L9 orthogonal array.

According to some embodiments of the present application, each of the aforementioned agitation parameters is divided into three levels of medium level, high level and low level.

According to some embodiments of the present application, the aforementioned scale-up polymerization vessel is configured to produce polyvinyl chloride, and the simulation quality includes an average particle size, a standard deviation of particle size, an oil absorption and an apparent specific gravity of the polyvinyl chloride.

According to some embodiments of the present application, the aforementioned optimized simulation parameter group is determined according to the average particle size of the polyvinyl chloride.

According to some embodiments of the present application, the aforementioned agitation parameters and the predictive agitation parameters are used as an input layer of the artificial intelligence neural network, and the product qualities and the prediction qualities are used as a corresponding output layer of the artificial intelligence neural network.

According to some embodiments of the present application, the aforementioned simulation process further comprises: adjusting an initial random seed of the artificial intelligence neural network to obtain the simulated prediction model comprising a plurality of simulation models. The simulation quality is an average value of simulation results of the simulation models.

According to some embodiments of the present application, the aforementioned simulation process further comprises: performing an augmentation step. The augmentation step is to divide a numerical range consisting of the agitation parameters and the predictive agitation parameters into a plurality of levels to obtain a plurality of augmentation parameters, thereby determining the optimized simulation parameter group.

According to some embodiments of the present application, the agitation parameters, the predictive agitation parameters and the augmentation parameters are used as an input layer of the artificial intelligence neural network, and the product qualities, the prediction qualities and a plurality of augmentation qualities are used as a corresponding output layer of the artificial intelligence neural network. The augmentation qualities respectively correspond to the augmentation parameters.

According to some embodiments of the present application, after the aforementioned optimized simulation parameter group is obtained, the method further comprises: performing a flow field simulation with the optimized simulation parameter group. The flow field simulation is performed for the small polymerization vessel and the scale-up polymerization vessel.

According to some embodiments of the present application, the aforementioned flow field simulation is performed with computational fluid dynamics simulation.

According to some embodiments of the present application, after the aforementioned prediction process and/or the simulation process is performed, the method further comprises: performing a verification process.

According to some embodiments of the present application, a volume of the aforementioned scale-up polymerization vessel is 220 $M^3$.

According to another aspect of the present application, a method for developing an agitation system of a scale-up polymerization vessel is provided. The agitation system is configured to be applied in the scale-up polymerization vessel configured to produce polyvinyl chloride. A reaction is firstly performed with a small polymerization vessel to obtain a plurality of experimental results. Each of the experimental results includes a plurality of structural parameter groups and a plurality of product qualities corresponding to the structural parameter groups, and each of the structural parameter groups includes a plurality of agitation parameters. Next, a prediction process is performed with Taguchi experimental design method and the experimental results to obtain a plurality of prediction results. The prediction results include a plurality of prediction parameter groups and a plurality of prediction qualities corresponding to the prediction parameter groups. Each of the prediction parameter groups includes a plurality of predictive agitation parameters. Then, a simulation process is performed with the experimental results and the prediction results to obtain a simulated prediction model. The simulation process is performed by an artificial intelligence neural network. After the simulation process, an augmentation step is performed. The augmentation step is to divide a numerical range consisting of the agitation parameters and the predictive agitation parameters into a plurality of levels to obtain a plurality of augmentation parameters, thereby obtaining a plurality of augmentation parameter groups. Each of the augmentation parameter groups includes the augmentation parameters and a corresponding augmentation quality. A stirring power is estimated according to each of the augmentation parameter groups. And then, the simulated prediction model is modified with the experimental results, the prediction results, the augmentation parameter groups and the stirring power corresponding to each of the augmentation parameter groups, and thereby an optimized simulation parameter group for constructing the scale-up polymerization vessel is obtained.

According to some embodiments of the present application, the aforementioned small polymerization vessel includes a plurality of stirring blades, and the agitation parameters include a stirring speed, a blade diameter and a blade width of each of the stirring blades, and/or a combination thereof.

According to some embodiments of the present application, the aforementioned optimized simulation parameter group is determined according to an average particle size of the polyvinyl chloride and the stirring power.

According to some embodiments of the present application, the aforementioned stirring power is estimated by a formula ($n^3d^5b$). In the formula, n represents the stirring speed, d represents the blade diameter, and b represents the blade width.

This scale-up polymerization vessel agitation system is configured for use in scale-up polymerization vessel. This development method uses small polymerization vessel to react first to obtain multiple experimental results. Wherein, each experimental result includes a plurality of structural parameter groups and a plurality of corresponding product qualities, and each structural parameter group includes a plurality of stirring parameters. Then, use the Taguchi experimental design method and the aforementioned experimental results to predict the process to obtain a plurality of prediction results. Wherein, the prediction results include a plurality of prediction parameter groups and corresponding plurality of prediction qualities, and each prediction parameter group includes a plurality of prediction mixing parameters.

Then, using the aforementioned experimental results and prediction results, the simulation process is carried out to obtain an optimized simulation prediction model, wherein the simulation process is performed by an artificial intelligence neural network. The simulated prediction model obtained by the artificial intelligence neural network can obtain the optimized simulation parameter set of the small polymerization vessel, wherein the optimized simulation parameter set includes a plurality of simulated stirring parameters and corresponding simulation quality. Accordingly, the geometry of the small polymerization vessel is scaled-up to a scale-up polymerization vessel, and the correspondence of the dimensionless group is confirmed by CFD simulation, and the multiple simulated stirring parameters and the corresponding simulation quality can be used to construct a scale-up polymerization vessel.

According to some embodiments of the present application, the aforesaid small polymerization vessel includes a plurality of agitating blades and a plurality of choke tubes, and the aforesaid agitating parameters include agitating speed, the blade diameter and blade width of each agitating blade, and the position of the uppermost one and the distance between each choke tube and the vessel wall.

According to some embodiments of the present application, the aforesaid scale-up polymerization vessel is configured to produce polyvinyl chloride, and the aforesaid simulated quality includes the average particle size, standard deviation of particle size, oil absorption and apparent specific gravity of polyvinyl chloride.

According to some embodiments of the present application, the aforementioned scale-up simulation parameter set is determined according to the average particle size.

According to some embodiments of the present application, the aforementioned simulation process can selectively adjust the initial guess value of the artificial intelligence neural network to obtain a simulated prediction model comprising a plurality of simulation models, and the simulation quality is the average of the simulation results of the simulation model value.

According to some embodiments of the present application, the aforesaid analog process may optionally perform an amplification step. In the amplification step, the numerical range formed by the aforementioned stirring parameters and the predicted stirring parameters is divided into a plurality of gears to obtain a plurality of amplification parameter values, so as to determine a scale-up simulation parameter set.

According to some embodiments of the present application, after obtaining the aforementioned scale-up simulation parameter set, the flow field simulation process is performed. Among them, the flow field simulation process is carried out by using the simulated stirring parameters of the optimized simulation parameter group of the small polymerization vessel and the scale-up polymerization vessel, so as to confirm the dimensionless correspondence between the stirring parameters of the small polymerization vessel and the scale-up polymerization vessel.

According to some embodiments of the present application, before performing the aforementioned predictive process and/or simulated process, verification is performed with small polymerization slots.

According to some embodiments of the present application, the volume of the aforementioned scale-up polymerization vessel is 220 $M^3$.

In the method for developing the agitation system of the scale-up polymerization vessel of the present application, corresponding relationships between agitation parameters and product qualities of the polymerization vessel are predicted and simulated by integrating Taguchi experimental design method with artificial intelligence neural network, thereby obtaining an optimized simulated prediction model, and further random agitation parameters and product qualities corresponding to the random agitation parameters can be realized. Therefore, it facilitates to the optimized construction of the agitation system of the scale-up polymerization vessel. The Taguchi experimental design method facilitates to reduce numbers of the reactions actually performed and further provides prediction results based on experimental results of the reactions actually performed. Based on the experimental results and the prediction results, relationships between agitation parameters and product qualities are further obtained by calculations of the artificial intelligence neural network, therefore providing a best simulated prediction model. The product qualities corresponding to random agitation parameters are realized based on the simulated prediction model, such that the present application contributes to construct the scale-up polymerization vessel.

BRIEF DESCRIPTION OF THE DRAWINGS

The invention can be more fully understood by reading the following detailed description of the embodiment, with reference made to the accompanying drawings as follows:

The single FIGURE illustrates a flow chart of a method for developing an agitation system of a scale-up polymerization vessel according to some embodiments of the present application.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Although the following content is exemplified by a polymerization vessel for reacting to form polyvinyl chloride, the present application is not limited thereto. According to the disclosures of the present application, one skilled in the art can apply the application to reaction vessels for obtaining other products.

Referring to the single FIGURE, it illustrates a flow chart of a method for developing an agitation system of a scale-up polymerization vessel according to some embodiments of the present application. In method 100, a reaction is performed with a small polymerization vessel to obtain experimental results, shown as operation 110. Each of the experimental results includes structural parameter groups and product qualities corresponding to the structural parameter groups. Each of the structural parameter groups includes a plurality of agitation parameters of the small polymerization vessel. In some embodiments, the small polymerization vessel includes a plurality of stirring blades and a plurality of choke tubes, and the agitation parameters can include but be not limited to a stirring speed, a blade diameter and a blade width of each of the stirring blades, a position of an uppermost stirring blade of the stirring blades (i.e. a highest position of the stirring blade), a distance between each choke tube and a vessel wall, other agitation parameters that can affect the product qualities, or a combination thereof. It can be realized that the choke pipes are disposed in the polymerization vessel, and the choke pipes are disposed along a direction parallel to an axis of the polymerization vessel. In some examples, the polymerization vessel of the present application can be applied to react to form polyvinyl chloride, and the product qualities can include but be not limited to an average particle size, a standard deviation of particle size, an oil absorption, an apparent specific gravity, and/or other interested product qualities of the polyvinyl chloride.

In order to effectively enhance the accuracy of the subsequent simulated prediction model established by the artificial intelligence neural network and reduce numbers of actual experimental groups, the operation 110 can be firstly performed by adopting a L9 orthogonal array to determine the agitations parameters for the reaction. In the L9 orthogonal array, each of the agitation parameters can be divided into three levels of medium level, high level and low level. The medium level represents existing agitation parameters, the high level and the low level are an upper limit and a lower limit of the parameters determined based on the general knowledge, and therefore the high level and the low level are the operating limitation of the agitation parameters. For example, when the middle level of the stirring speed is 381 rpm, the high level can be 400 rpm, and the low level can be 324 rpm. Accordingly, the agitation parameters of the polymerization vessel are determined based on permutations and combinations of the three levels in the L9 orthogonal array to be applied in the reaction, and therefore the product quality corresponding to each permutation and combination can be obtained. In some examples, when numbers of the agitation parameters are 4, it merely subjects 9 groups of the experiments in the polymerization vessel based on the permutations and combinations of the three levels in the L9 orthogonal array. Therefore, 9 product qualities are correspondingly obtained.

After the operation 110 is performed, a prediction process is further performed with the Taguchi experimental design method to obtain a plurality of prediction results, shown as operation 120. The prediction results include prediction parameter groups and prediction qualities corresponding to the prediction parameter groups. When the prediction process is performed, each of the prediction qualities corresponding to the prediction parameter group can be predicted by the Taguchi experimental design method based on the experimental results obtained in the operation 110. Predictive agitation parameters in the prediction parameter groups are residual permutations and combinations of the three level of the agitation parameters except the permutations and combinations in the L9 orthogonal array. In the aforementioned examples, when numbers of the agitation parameters are 4, permutations and combinations of the three levels should be $3^4$ groups (i.e. 81 groups). 9 groups of the permutations and combinations can be presented in the L9 orthogonal array, and therefore the predictive agitation parameters in the prediction parameter groups are the residual 72 groups of the permutations and combinations of the agitation parameters. The Taguchi experimental design method and its application are well known to one skilled in the art rather than focusing or mentioning them in details. Accordingly, it is well known to one skilled in the art to further predict each of the predication qualities corresponding to the prediction parameter group with the Taguchi experimental design method and the experimental results obtained from the actual reaction.

After the operation 120 is performed, a verification process is further performed to determine whether there is an excessive deviation in the prediction results obtained from the prediction process or not. In the verification process, the aforementioned prediction results are randomly selected, and the predictive agitation parameters in the corresponding prediction parameter group are adopted to actually perform a reaction, and further product qualities obtained from the reaction can be applied to determine whether there is an excessive deviation in the prediction qualities of the corresponding prediction result or not. It can be realized that the operation 120 of the present application can efficiently applied to predict the prediction qualities of the polymerization vessel based on the verification process. In a situation that an excessive deviation is presented, the deviation can also be neutralized by an average result of multiple repeated experiments. Therefore, the prediction results obtained from the operation 120 is helpful for quantitative prediction.

Continuously referring to the single FIGURE. After the operation 120 is performed, a simulation process is performed, shown as operation 130. The simulation process is performed with an artificial intelligence neural network to simulate and predict relationships between the aforementioned experimental results and the agitation parameters and the product qualities in the prediction results, thereby obtaining a best simulated prediction model.

When the simulation process is performed, the agitation parameters in the experimental results and the prediction results are used as an input layer of the artificial intelligence neural network, and the product qualities in the experimental results and the prediction qualities in the prediction results are used as a corresponding output layer. Then, a simulated prediction model can be obtained by two hidden layers in the artificial intelligence neural network and the values introduced into the input layer and the output layer, and therefore a product quality corresponded to random agitation parameters can be determined. In some embodiments, numbers of neurons in each of the two hidden layers of the present application are both 40. It can be realized that the artificial intelligence neural network can learn and calculate the simulated prediction model of the aforementioned experimental results and the prediction results based on the relationships between the experimental results and the agitation parameters and the product qualities in the prediction results, and thereby the artificial intelligence neural network can expand the product qualities corresponding to other parameters based on the simulated prediction mode.

In a training process of the artificial intelligence neural network, a difference between prediction values of the artificial intelligence neural network and the actual values can be realized by loss functions of the mean square errors, and therefore partial differential of the input values can further be obtained, and the simulated prediction mode can be optimized by an algorithm of gradient descent.

In some embodiments, when the aforementioned simulation process is performed, initial random seeds of the artificial intelligence neural network can be further adjusted to vary the learning operation of the artificial intelligence neural network to obtain a plurality of simulation models. It can be realized that although the simulation models are different from each other, there are good reproducibility presented in all of the agitation parameters and the corresponding product qualities obtained from the simulation models. In these embodiments, the aforementioned simulated prediction model includes these simulation models, and therefore simulated agitation parameters in following scale-up simulation parameter groups are respectively inputted into each of the simulation models to independently obtain corresponding simulation qualities. In order to lower influences of deviations among the simulation models on the simulation qualities of the scale-up simulation parameter groups, an average value of the obtained simulation qualities is the simulation quality of the scale-up simulation parameter group.

In these embodiments, after the aforementioned simulated prediction model or the simulated prediction model including a plurality of simulation models is obtained, an augmentation step is further performed for efficiently decide the scale-up simulation parameter group. The augmentation step is performed to equally divide a numerical range consisting of the aforementioned agitation parameters (i.e. the agitation parameters and the predictive agitation parameters obtained from the operation 110 and the operation 120) into a plurality of levels (n levels) to obtain a plurality of augmentation parameters. A plurality of simulation qualities are correspondingly obtained by inputting the augmentation parameters into the simulated prediction model, and thereby it can subject the decided scale-up simulation parameter group to much meet requirements. In some examples, there are no specific limitations to the value of n as long as n is a positive integer. The obtained scale-up simulation parameter group can further much meet the requirements as an increasing of the value of n. For example, when there are 4 agitation parameters is 4, a numerical range of each of the agitation parameters can be equally divided into 10 levels, and therefore 10000 ($10^4$) augmentation parameters can be obtained. It can be realized that the aforementioned numerical ranges are respectively determined by the high level and low level of each of the parameters because the predicative agitation parameters obtained from the operation 120 are acquired from the predication of the Taguchi experimental design method to the agitation parameters of the operation 110.

When the augmentation step is performed, the numerical ranges of the agitation parameters can be divided into a plurality of levels, thereby obtaining a plurality of augmentation agitation parameters, and therefore augmentation qualities corresponding to each of the augmentation agitation parameters can be calculated based on theoretical bases of the polymerization vessel. The augmentation qualities are different from the aforementioned product qualities and the prediction qualities. Then, the agitation parameters of the experimental results, predictive agitation parameters of the prediction results and the augmentation agitation parameters are used as the input layer of the artificial intelligence neural network, and the product qualities of the experimental results, prediction qualities of the prediction results and augmentation qualities are used as the output layer of the artificial intelligence neural network. Accordingly, the simulated prediction model can be obtained. It can be realize that the obtained simulated prediction model can give consideration to the relationships between the agitation parameters and the product qualities and the relationships between the augmentation agitation parameters and the augmentation qualities.

The agitation parameters of the polymerization vessel can include a stirring speed, a blade diameter and a blade width of the stirring blade, and an uppermost position of the stirring blades (i.e. the position of the stirring blade disposed at the highest altitude). The product qualities of the polymerization vessel include an average particle size, a standard deviation of particle size, an oil absorption and an apparent specific gravity of the polyvinyl chloride. In the polymerization vessel, the stirring power generated by the agitation system has a corresponding relationship with the stirring parameters, and therefore the stirring power can meet economic benefits except ensuring that the product qualities meet requirements when the stirring power is estimated with the stirring parameters. Based on the theoretical basis, the stirring power of the polymerization vessel can be calculated by a following formula (I).

$$P = kN_p n^3 d^5 \quad (I)$$

In the formula (I), k is a constant; P represents the stirring power; Np represents a power number and contains an influence of the blade width where there is a linear relationship between the blade width and the stirring power; n represents the stirring speed; and d represents the blade diameter. Accordingly, the stirring power can be simplified to be related to the stirring speed to the third power ($n^3$), the blade diameter to the fifth power ($d^5$) and the blade width (b). Therefore, the stirring power can be estimated by a formula ($n^3d^5b$).

Then, an augmentation step is performed to the agitation parameters such as the aforementioned stirring speed, the blade diameter and the blade width to obtain augmentation agitation parameters. And then, the stirring power corresponding to each of the augmentation agitation parameters is estimated with the formula ($n^3d^5b$), and the stirring powers are used as augmentation qualities.

The artificial intelligence neural network is trained with the aforementioned agitation parameters, the product qualities, the augmentation agitation parameters and the augmentation qualities, thereby obtaining an optimized simulated prediction model that gives consideration to the product qualities and the augmentation qualities, and therefore accuracy of the simulated prediction model can be efficiently enhanced.

After the operation 130 is performed, a verification process is further performed to determine whether the scale-up simulation parameter group obtained by the simulated prediction model is accurate or not. The verification process is firstly to input a random simulated agitation parameter to the simulated prediction model, thereby obtaining the corresponding simulation quality. And then, a reaction is actually performed with the simulated agitation parameter to obtain a product quality. Accordingly, the product quality obtained from the reaction can be used to determine whether there is an excessive deviation in the simulation quality or not. In the verification process, the reaction is actually performed with a small polymerization vessel to simulate the quality result of the scale-up polymerization vessel.

Continuously referring to the single FIGURE. After the operation 130 is performed, scale-up optimized simulation parameter group of the polymerization vessel can be obtained with the simulated prediction model. The scale-up optimized simulation parameter group includes simulated agitation parameters and a simulation quality corresponding to the simulated agitation parameters. The decision of the scale-up simulation parameter group (i.e. the scale-up optimized parameter group) is made by selecting the desired simulated agitation parameter and/or the desired simulation quality. In some embodiments, the simulated agitation parameters for the polymerization vessel applied to produce the polyvinyl chloride can be decided by the average particle size of the polyvinyl chloride, and further the scale-up optimized simulation parameter group is decided. For example, the decision of the simulated agitation parameters is made with a smaller average particle size of the polyvinyl chloride used as a main determinant. Besides, it can be realized that the influence of a variation tendency of the agitation parameters on the product qualities based on the obtained simulated prediction model.

In some embodiments, after the optimized simulation parameter group is obtained with the small polymerization vessel, a comparison of a flow field simulation can be further performed with the optimized simulated agitation parameters in the simulation parameter group of the small polymerization vessel and optimized simulation parameters of the geometrically amplified polymerization vessel, thereby obtaining corresponding properties between dimensionless groups to verify the accuracy of constructing the small polymerization vessel and the scale-up polymerization vessel with the simulated agitation parameters, shown as operation 140. Based on the verification of the flow field simulation, the simulated agitation parameters obtained from the small polymerization vessel can be applied in the scale-up polymerization vessel. Therefore, scale-up of the agitation system of the polymerization vessel is achieved, and further it facilitates to the constructing of the scale-up polymerization vessel. In some examples, the flow field simulation process can be performed with Ansys Fluent software to simulate computational fluid dynamics (CFD) in the small polymerization vessel and the scale-up polymerization vessel. After the dimensionless corresponding properties of the optimized agitation parameters of the small polymerization vessel and the scale-up polymerization vessel have been verified (i.e. the operation 140), the scale-up polymerization vessel can be constructed with the simulated agitation parameters of the aforementioned scale-up optimized simulation parameter group, shown as operation 150.

In the process of scaling-up a volume of the polymerization vessel, the dispersion uniformity of monomer compounds in the scale-up polymerization vessel will affect reactivity. Therefore, the development method of the present application integrates the prediction of the Taguchi experimental design method with the learning calculation of the artificial intelligence neural network, thereby obtaining the simulated prediction model, and further the product qualities corresponding to random agitation parameters will be realized, such that the method of the present application facilitates to obtain the agitation parameters suitable for the scale-up polymerization vessel. The Taguchi experimental design method facilitates to reduce the number of the actual reactions necessary to be performed. The experimental results and the prediction results are further inputted into the artificial intelligence neural network to obtain the corresponding relationship between the agitation parameters and the product qualities with the learning calculation, and further the best simulated prediction model can be obtained. Further, the method of the present application can provide the proof of the effectiveness of the scaling-up design of the polymerization vessel with similar dimensions but different volumes based on the dimensionless corresponding properties between the agitation flow fields in the small polymerization vessel and the scale-up polymerization vessel.

In the development method of the present application, the experimental results can be obtained by performing trail runs with a small trail vessel of 200 L and a polymerization vessel of 130 $M^3$. The Taguchi experimental design method is further performed to predict prediction qualities corresponding to other agitation parameters, thereby enhancing variability of the parameters to facilitate the following learning operation of the artificial intelligence neural network. Then, the simulated prediction model suitable for a scale-up polymerization vessel of 220 $M^3$ can be obtained by the artificial intelligence neural network with the experimental results and the prediction results, and further the simulated agitation parameters for constructing the scale-up polymerization vessel can be obtained. The simulated agitation parameters for constructing the scale-up polymerization vessel are determined according to the average particle size (e.g. 117 μm to 125 μm) of the polyvinyl chloride. Moreover, the parameters for constructing the scale-up polymerization vessel can be determined according to variation tendencies of a smaller particle size, a smaller standard deviation of particle size, a more oil absorption, a larger apparent specific gravity and/or the like. Besides, a smaller stirring power can further optimize the constructing of the scale-up polymerization vessel. Based on the variation tendency of the qualities in the simulated prediction model, it facilitates to control the average particle size of the polyvinyl chloride by adjusting the agitating speed, the blade diameter, the blade width, the altitude of the uppermost stirring blade (i.e. the position of the uppermost stirring blade) or a combination thereof.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for developing an agitation system of a scale-up polymerization vessel, and the agitation system is configured to be applied in the scale-up polymerization vessel, wherein the method comprises:

performing a reaction with a polymerization vessel to obtain a plurality of experimental results, wherein each of the experimental results includes a plurality of structural parameter groups and a plurality of product qualities corresponding to the structural parameter groups, and each of the structural parameter groups includes a plurality of agitation parameters;

performing a prediction process with Taguchi experimental design method and the experimental results to obtain a plurality of prediction results, wherein the prediction results include a plurality of prediction parameter groups and a plurality of prediction qualities corresponding to the prediction parameter groups, and each of the prediction parameter groups includes a plurality of predictive agitation parameters;

performing a simulation process with the experimental results and the prediction results to obtain a simulated prediction model, wherein the simulation process is performed by an artificial intelligence neural network, and the simulation process comprises:

adjusting an initial random seed of the artificial intelligence neural network to obtain the simulated prediction model comprising a plurality of simulation models;

obtaining an optimized simulation parameter group of the polymerization vessel by the simulated prediction model, wherein the optimized simulation parameter group includes a plurality of simulated agitation parameters and a simulation quality corresponding to the simulated agitation parameters; and constructing the scale-up polymerization vessel based on the simulated agitation parameters.

2. The method for developing the agitation system of the scale-up polymerization vessel of claim 1, wherein the polymerization vessel includes a plurality of stirring blades and a plurality of choke tubes, and the agitation parameters include a stirring speed, a blade diameter and a blade width of each of the stirring blades, a position of an uppermost stirring blade of the stirring blades, a distance between each of the choke tubes and a vessel wall, and/or a combination thereof.

3. The method for developing the agitation system of the scale-up polymerization vessel of claim 1, wherein the agitation parameters are determined by a L9 orthogonal array.

4. The method for developing the agitation system of the scale-up polymerization vessel of claim 3, wherein each of the agitation parameters is divided into three levels of medium level, high level and low level.

5. The method for developing the agitation system of the scale-up polymerization vessel of claim 1, wherein the scale-up polymerization vessel is configured to produce polyvinyl chloride, and the simulation quality includes an average particle size, a standard deviation of particle size, an oil absorption and an apparent specific gravity of the polyvinyl chloride.

6. The method for developing the agitation system of the scale-up polymerization vessel of claim 5, wherein the optimized simulation parameter group is determined according to the average particle size of the polyvinyl chloride.

7. The method for developing the agitation system of the scale-up polymerization vessel of claim 1, wherein the agitation parameters and the predictive agitation parameters are used as an input layer of the artificial intelligence neural network, and the product qualities and the prediction qualities are used as a corresponding output layer of the artificial intelligence neural network.

8. The method for developing the agitation system of the scale-up polymerization vessel of claim 1, wherein the simulation quality is an average value of simulation results of the simulation models.

9. The method for developing the agitation system of the scale-up polymerization vessel of claim 8, wherein the simulation process further comprises:

performing an augmentation step, wherein the augmentation step is to divide a numerical range consisting of the agitation parameters and the predictive agitation parameters into a plurality of levels to obtain a plurality of augmentation parameters, thereby determining the optimized simulation parameter group.

10. The method for developing the agitation system of the scale-up polymerization vessel of claim 9, wherein the agitation parameters, the predictive agitation parameters and the augmentation parameters are used as an input layer of the artificial intelligence neural network, and the product qualities, the prediction qualities and a plurality of augmentation qualities are used as a corresponding output layer of the artificial intelligence neural network;

the augmentation qualities respectively correspond to the augmentation parameters.

11. The method for developing the agitation system of the scale-up polymerization vessel of claim 1, wherein after the optimized simulation parameter group is obtained, the method further comprises:

performing a flow field simulation with the optimized simulation parameter group, wherein the flow field simulation is performed for the polymerization vessel and the scale-up polymerization vessel.

12. The method for developing the agitation system of the scale-up polymerization vessel of claim 11, wherein the flow field simulation is performed with computational fluid dynamics simulation.

13. The method for developing the agitation system of the scale-up polymerization vessel of claim 1, wherein after the prediction process and/or the simulation process is performed, the method further comprises:

performing a verification process.

14. The method for developing the agitation system of the scale-up polymerization vessel of claim 1, wherein a volume of the polymerization vessel is 130 $M^3$, and a volume of the scale-up polymerization vessel is 220 $M^3$.

15. A method for developing an agitation system of a scale-up polymerization vessel, and the agitation system is configured to be applied in the scale-up polymerization vessel configured to produce polyvinyl chloride, wherein the method comprises:

performing a reaction with a polymerization vessel to obtain a plurality of experimental results, wherein each of the experimental results includes a plurality of structural parameter groups and a plurality of product qualities corresponding to the structural parameter groups, and each of the structural parameter groups includes a plurality of agitation parameters;

performing a prediction process with Taguchi experimental design method and the experimental results to obtain a plurality of prediction results, wherein the prediction results include a plurality of prediction parameter groups and a plurality of prediction qualities corresponding to the prediction parameter groups, and each of the prediction parameter groups includes a plurality of predictive agitation parameters;

performing a simulation process with the experimental results and the prediction results to obtain a simulated prediction model, wherein the simulation process is performed by an artificial intelligence neural network;

performing an augmentation step after the simulation process, wherein the augmentation step is to divide a numerical range consisting of the agitation parameters and the predictive agitation parameters into a plurality of levels to obtain a plurality of augmentation parameters, thereby obtaining a plurality of augmentation parameter groups, wherein each of the augmentation parameter groups includes the augmentation parameters and a corresponding augmentation quality;

estimating a stirring power according to each of the augmentation parameter groups; and modifying the simulated prediction model with the experimental results, the prediction results, the augmentation parameter groups and the stirring power corresponding to each of the augmentation parameter groups, thereby obtaining an optimized simulation parameter group for constructing the scale-up polymerization vessel.

16. The method for developing the agitation system of the scale-up polymerization vessel of claim 15, wherein the polymerization vessel includes a plurality of stirring blades, and the agitation parameters include a stirring speed, a blade diameter and a blade width of each of the stirring blades, and/or a combination thereof.

17. The method for developing the agitation system of the scale-up polymerization vessel of claim 16, wherein the optimized simulation parameter group is determined according to an average particle size of the polyvinyl chloride and the stirring power.

18. The method for developing the agitation system of the scale-up polymerization vessel of claim 16, wherein the stirring power is estimated by a formula ($n^3d^5b$), and wherein n represents the stirring speed, d represents the blade diameter, and b represents the blade width.

* * * * *